3,574,555
RADIATION SENSITIVE CIRCUIT FOR DETECTING COMBUSTIBLE GAS

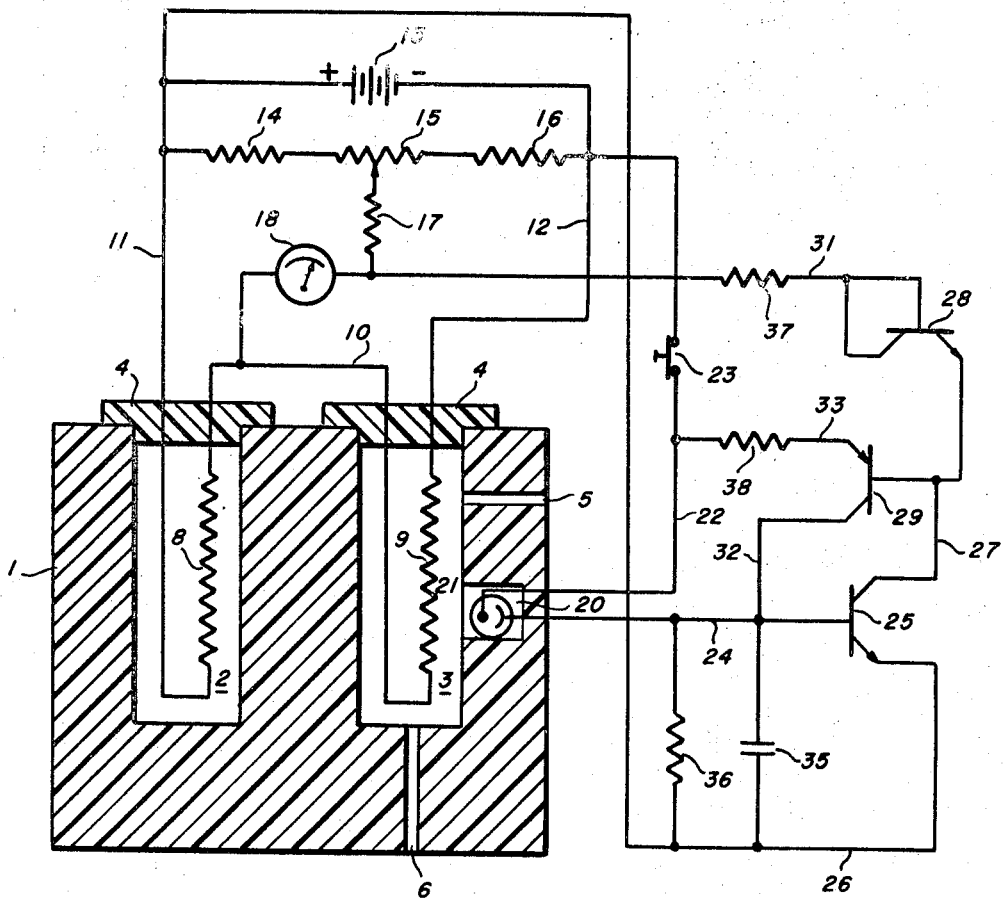

Glenn H. Fertig, Pittsburgh, Pa., assignor to Mine Safety Appliances Company, Pittsburgh, Pa.
Filed Sept. 26, 1969, Ser. No. 861,359
Int. Cl. G01n *31/10;* G02f *1/28*
U.S. Cl. 23—254      8 Claims

ABSTRACT OF THE DISCLOSURE

A photoelectric cell is focused on the catalytic detector filament of a combustible gas indicator, in which a meter is operated by changes in the electrical resistance of the filament. A normally open auxiliary circuit also is connected with the meter for operating it independently of the filament. Whenever the filament glows, which causes the electrical resistance of the photoelectric cell to change, current flows through the cell to close the auxiliary circuit and maintain it closed.

---

It often is is important to know the concentration of combustibles in air for the purpose of safety, or to insure a sufficient supply of fuel to a process. For determining the concentration, combustible gas indicators are used in which there is a Wheatstone bridge circuit containing a meter and a pair of electrically heated catalytic filaments. The bridge is balanced so that there will be no flow of current in the meter circuit as long as there are no combustibles in the gas sample flowing around the filament that serves as the detector. On the other hand, catalytic combustion will take place on that filament if there are combustibles in the sample, and the sample will be oxidized. The heat released by the oxidation reaction increases the temperature of the filament, thereby causing the electrical resistance of the filament to increase and unbalance the bridge circuit so that current will flow through the meter. The amount of unbalance is measured by the meter and is proportional to the gas concentration. The meter usually is calibrated to read full scale when the combustible concentration reaches the point where it can cause an explosion.

If the combustible concentration is even greater, effects may take place in the sample chamber which will give an erroneous reading. For example, the concentration may become so great that there is not enough oxygen to support combustion. Or, a gas with a high percentage of combustibles may have such a high thermal conductivity that it will actually cool the filament. Under such conditions, the measuring instrument may indicate no combustibles when in reality there may be 100 percent combustibles in the sampling chamber. Obviously, such a false reading can create a very dangerous situation.

It is among the objects of this invention to provide a combustible gas indicator which will indicate an unsafe condition even if the sample contains as much as 100 percent combustibles.

The preferred embodiment of the invention is illustrated in the accompanying drawing, in which the single figure is a diagrammatic view of the indicator with part shown in section.

Referring to the drawing, a suitable block 1 or the like is provided with two chambers 2 and 3, each of which is closed by a plug or cap 4. One chamber 2 is completely sealed, but the other one is provided with inlet and outlet passage 5 and 6 so that a sample of a gas in question can be passed through it. The term "gas" is to be understood as including vapor.

A reference filament 8 of platinum is disposed in the sealed chamber, while a similar filament 9 is located in the sampling chamber 3. These two filaments are connected by a wire 10 passing through the two caps. They also are connected by wires 11 and 12 to a battery 13 outside of the block and are heated by the electric current. Shunting the battery are three resistors 14, 15 and 16, the center one of which is connected through another resistor 17 with a meter 118 or recorder to the wire 10 between the filaments. The circuit thus formed is a Wheatstone bridge circuit, which can be adjusted so that no current flows through the meter when there are no combustibles in the sample chamber. The apparatus described thus far is old and well known and has the shortcoming referred to above when the sample gas contains more than the minimum amount of combustibles that would cause an explosion.

It is a feature of this invention that such a combustible gas indicator is provided with means that will cause it to show an unsafe condition even when the sample gas contains 100 percent combustibles. Accordingly, the block at one side of the sampling chamber 3 is provided with a recess 20, in which a photoelectric cell 21 is mounted. This cell is focused on the sampling filament. The electrical resistance of the cell depends upon the amount of radiant energy reaching it. When a cell is used, the resistance of which decreases as the radiant energy increases, one terminal of the cell is connected by a wire 22 and a normally closed switch 23 with wire 12. The other terminal of the cell is connected by a wire 24 with the base of a transistor 25. The emitter of this transistor is connected by a wire 26 with wire 11, and the collector is connected by a wire 27 with the emitter of a second transistor 28 and with the base of a third transistor 29. The base and the collector of the second transistor 28 are connected by a wire 31 with the meter at a point between the meter and resistor 17. The collector of the third transistor 29 is connected by a wire 32 with the base of transistor 25, which the emitter of the third transistor 29 is connected by a wire 33 to wire 22 between the photocell and switch 23.

During operation of this indicator, the detector filament 9 does not give off radiant energy, such as infrared rays or visible light, as long as the combustibles concentration in the gas sample stays below the lower explosive limit, so under such conditions the indicator operates as in the past. However, once the lower explosive limit is reached or passed slightly, the catalytic combustion at the detector filament will become great enough to raise the filament temperature until it glows and emits radiant energy. This causes the resistance of the photocell to decrease and allow enough current to flow through it to transistor 25 to unclamp the base and allow the transistor to become conductive. As soon as this happens, current flows through the transistor to the second transistor 28 and the meter. As long as this current flows in the meter circuit, the meter will continue to register the explosive condition of the gas sample. Transistor 28 is connected in diode configuration to block current flow through the bridge when the photocell circuit is in a non-operative condition.

The current through transistors 25 and 28 also turns on the third transistor 29 so that current can flow through it between wire 22 and the base of transistor 25 even though the filament, due to the high concentration of combustibles, now becomes dark and allows the resistance of the photocell to again increase to its original value. In other words, transistor 29 forms a lock-in for the photocell circuit so that the meter will continue to register an explosive concentration of combustibles until reset switch 23 is opened. As the combustible concentration rises above the lower explosive limit of the gas, the detector will glow for at least a moment until the concentration becomes too great for further catalytic combustion. That glow is enough to turn on transistor 25.

A condenser 35 connecting the base of transistor 25 with wire 26 protects the circuit against false triggering by stray electric fields. The resistor 36 beside it is a bias resistor that is used to normally hold transistor 25 in a nonconductive state. The othes two resistors 37 and 38 are merely for limiting the current in these auxiliary circuits.

If it is desired to use a photocell, the electrical resistance of which increases when the cell is exposed to radiant energy, one terminal is connected to wire 24 as shown, but the other terminal is connected to wire 26 instead of to wire 22. Also, one terminal of resistor 36 is connected to wire 24 as shown, while the other terminal is connected to wire 22 instead of to wire 26. With such an arrangement, when the resistance of the photocell increases, enough current will flow through resistor 36 to transistor 25 to allow it to become conductive.

I claim:

1. In a combustible gas indicator, the combination with a heated catalytic detector filament electrically connected with a meter for operating the meter when the temperature of the filament is raised by a combustible gas surrounding the filament, of a photoelectric cell focused on the filament and having an electrical resistance that changes when the cell is exposed to radiant energy emitted by the filament, a normally open electric circuit connected with the meter for operating it independently of said filament, and means in said circuit electrically connected with said cell and operated by current conducted to it when the electrical resistance of the cell changes for closing the circuit and maintaining it closed, whereby whenever said filament glows said circuit will be closed.

2. In a combustible gas indicator as recited in claim 1, said circuit-closing means including a normally nonconductive transistor that is rendered conductive by said current.

3. In a combustible gas indicator as recited in claim 2, the emitter and collector of said transistor being connected in said circuit, and the base of the transistor being connected to said cell.

4. In a combustible gas indicator as recited in claim 1, the means for maintaining said circuit closed including a normally open circuit by-passing said cell, and means operated by current flowing through said first-mentioned circuit for closing said by-pass circuit.

5. In a combustible gas indicator as recited in claim 4, said by-pass circuit-closing means being a normally nonconductive transistor.

6. In a combustible gas indicator as recited in claim 1, said means for closing and maintaining closed said circuit including a normally nonconductive transistor that is rendered conductive when said cell resistance changes, a normally open circuit by-passing said cell, and a normally nonconductive transistor in said by-pass circuit operated by current flowing through said first-mentioned circuit for closing the by-pass circuit.

7. In a combustible gas indicator as recited in claim 1, in which the electrical resistance of said photoelectric cell decreases when the cell is exposed to radiant energy, and said current flows through the cell to said circuit-closing means.

8. In a combustible gas indicator as recited in claim 7, said circuit-closing means including a normally conductive transistor that is rendered conductive when said cell resistance decreases.

References Cited

UNITED STATES PATENTS

| | | | |
|---|---|---|---|
| 3,041,590 | 6/1962 | Lucci | 250—217X |
| 3,233,233 | 2/1966 | Palmer | 340—237 |
| 3,238,519 | 3/1966 | Ramsey | 340—237 |
| 3,284,165 | 11/1966 | Baumann et al. | 23—255 |

WALTER STOLWEIN, Primary Examiner

U.S. Cl. X.R.

23—255; 250—217

UNITED STATES PATENT OFFICE
CERTIFICATE OF CORRECTION

Patent No. 3,574,555　　　　　　　　　　Dated April 13, 1971

Inventor(s) Glenn H. Fertig

It is certified that error appears in the above-identified patent and that said Letters Patent are hereby corrected as shown below:

The polarity of battery 13 in the drawing should be read as the reverse of what is indicated.

Signed and sealed this 29th day of February 1972.

(SEAL)
Attest:

EDWARD M. FLETCHER, JR.　　　　　　ROBERT GOTTSCHALK
Attesting Officer　　　　　　　　　　Commissioner of Patents

FORM PO-1050 (10-69)